United States Patent [19]
Hume et al.

[11] Patent Number: 5,554,395
[45] Date of Patent: Sep. 10, 1996

[54] OPEN BORE INJECTION MOLDING APPARATUS

[75] Inventors: William J. Hume, Amesbury; Paul M. Swenson, Hamilton, both of Mass.

[73] Assignee: Kona Corporation, Gloucester, Mass.

[21] Appl. No.: 367,779

[22] Filed: Dec. 30, 1994

Related U.S. Application Data

[63] Continuation of Ser. No. 105,799, Aug. 12, 1993, abandoned.
[51] Int. Cl.$^6$ .................................................. B29C 45/20
[52] U.S. Cl. ................................. 425/549; 264/328.15
[58] Field of Search .................................. 425/549, 562, 425/563, 564, 565, 566; 264/328.15

[56] References Cited

U.S. PATENT DOCUMENTS

| | | | |
|---|---|---|---|
| 4,611,394 | 9/1986 | Gellert | 29/611 |
| 4,705,473 | 11/1987 | Schmidt | 425/549 |
| 4,921,708 | 5/1990 | Gellert | 425/549 |
| 5,015,170 | 5/1991 | Gellert | 425/549 |
| 5,254,305 | 10/1993 | Fernandez et al. | 425/564 |

OTHER PUBLICATIONS

Hackh's Chemical Dictionary, 1969, p. 342.
D-M-E News, 1987 vol. 44 No. 1.

*Primary Examiner*—Tim Heitbrink
*Attorney, Agent, or Firm*—Pandiscio & Pandiscio

[57] ABSTRACT

For open bore injection molding, the apparatus includes in combination a hot bushing, a cold mold, and a thin-walled seal. The bushing is adapted to convey molten material from a hot manifold to an article formation cavity in the mold. The mold defines a bore extending into its upper surface, and a gate at the bottom of the bore which communicates with the article formation cavity. The bushing at least partially fits within, and in spaced relation to, the periphery of the bore. The bushing includes an unobstructed lumen therethrough which opens into its lower end and is generally aligned with the gate. The bushing also defines a depressed portion in its outer surface located in closely spaced, circumferential relation to the opening of the lumen into its lower end. The thin-walled seal is formed of metallic material having low thermal conductivity, and has a generally arc-shaped cross-section. Further, the seal engages the depressed portion of the outer surface of the bushing, and has a small portion compressively urged against the surfaces defining the bore when the bushing is located in the bore. The seal closes off the gap between the bushing and the mold, while at the same time minimizing the conduction of heat therebetween.

28 Claims, 8 Drawing Sheets

OPEN BORE INJECTION MOLDING APPARATUS

This is a continuation of application Ser. No. 08/105,799 filed on Aug. 12, 1993 now abandoned.

BACKGROUND

1. Field of Invention

The present invention relates generally to injection molding systems. More particularly, the invention relates to a hot sprue bushing and to hot runner injection molding apparatus providing improved thermal gate control.

2. Summary of the Prior Art

Hot runner, or so-called "runnerless" injection molding apparatus are well known in the art. Basically, these apparatus may be classified in three distinct categories, namely, (1) insulated, (2) internally heated (sometimes referred to as "modified insulated"), and (3) "true" hot runner (sometimes referred to as "open bore hot manifold").

The insulated runner apparatus was the first apparatus which allowed a molder to produce parts without sprues or runners attached thereto. In basic design, this type of apparatus includes a channel milled between two plates located in stacked relation to one another adjacent to one side of the mold. This channel is continued to locations abutting the mold. At these locations, small gates (holes) are provided between the channel ends and the respective article formation cavities of the mold.

In operation, the channel is filled with plastic material in molten form. The material adjacent to the outer portions of the channel solidifies so as to insulate the material in the center of the channel from the comparatively cold metal forming the channel walls. Hence, so long as a flow of hot material is maintained through the central portion of the channel, sufficient heat is continuously introduced into the system to keep the runner flowing.

This apparatus is very sensitive to cycle interruptions and/or overly long cycle times. This is because the runner will solidify in the absence of a substantially continuous input of heat supplied by a flow of molten material therethrough. More particularly, the cycle of an injection molding machine includes (a) a high melt pressure injection portion; and (b) a subsequent portion during which the applied melt pressure is reduced. During the latter portion of the cycle, the molded article is solidified, the mold opened, the article ejected and the mold reclosed. It, therefore, will be understood that the insulated apparatus is limited to the manufacture of thin walled articles (i.e., articles having a small, comparatively fast solidifying volume) in a fast cycling mold. In addition, the length of the various runner channels must be comparatively short in order to avoid "freeze off" during the low melt pressure interval. Accordingly, such apparatus are limited to use with molds containing a limited number of cavities. In view of these drawbacks, the insulated apparatus is not currently in common use by production molders.

The internally heated apparatus adds heaters (commonly of the electrical resistance type) within the runner channels and also substantially adjacent to the gate area of an insulated injection molding apparatus. The addition of these heaters alleviates the problems of runner and/or gate freeze-off during cycle interruptions in insulated apparatus. Several other problems are created, however.

Specifically, since electrical resistance heaters inherently display a temperature gradient along their lengths, their use creates regions which are hotter and regions which are colder than the desired operating temperature of the apparatus along the runner path. Accordingly, it is necessary to adjust the temperature output from the colder regions so as to assure that melt freeze off will not occur in those regions. As a result, however, the temperature of the hotter regions is also increased. This may cause material degradation or burning in the hotter regions. In addition, the apparatus is inefficient in terms of energy input.

Further, material flow through such internally heated apparatus has been found to be non-uniform. In particular, the need for the melt to flow in annular channels surrounding the heater elements creates undesirable pressure losses along the length of the runner channels.

In the "true" hot runner apparatus, the material in the runner channels is substantially continuously heated from outside the melt flow. This is accomplished by heating a manifold containing the runner channel(s) under the control of thermocouples. The temperature of the metallic manifold, therefore, may be maintained at the desired melt temperature.

Such "true" hot runner apparatus allow flexibility in runner channel sizing, high material flow to surface contact ratios and the control of melt flow balance. Specifically, melt flow balance to numerous article formation cavities in the mold may be achieved (i) by the design of even numbers of branching runner channels in the heated manifold, and/or (ii) by the control of gate orifice cross-sections so as to balance the pressure utilized to deliver the melt to each article formation cavity of the mold. Hence, such "true" hot runner apparatus (1) may process substantially all thermoplastic materials, (2) may supply melt material to several article formation cavities simultaneously, and (3) may be made to mold diverse part volumes—all without adverse consequences to article quality or apparatus operation.

"True" hot runner apparatus also generally include elongate drops or bushings. These elements define central runner channels which communicate with the manifold runner channels. More particularly, the bushings are sealingly connected to the hot manifold and extend therefrom to locations adjacent to the critical gate areas of the mold. At these gate areas, the melt material flowing from the manifold runner channels through the bushings is ejected from the bushings, and injected into the article formation cavities of the mold through the gate.

Typically, the connection of the bushing to the manifold is formed by a threaded, surface compression fit or other rigid engagement of the upper end of the bushing with the lower portion of the manifold. This engagement of the bushing with the manifold also generally includes a seal to prevent flashing of the melt material between the adjoining hot surfaces of the manifold and the bushing. This seal commonly consists of a hollow, stainless steel, gasket-like O-ring. This O-ring resides in an annular space defined by a groove adjacent the interface of the lower surface of the manifold and an upwardly facing surface of the bushing.

The bushings are maintained at the melt temperature by appropriate heating means such as heater bands, coil heaters or heat pipes. In at least the latter of these alternatives, the bushing heat may be derived directly from the manifold so as to remain in balance therewith. Further, since both the manifold and the bushing are maintained at the melt temperature, means must be provided to substantially isolate those elements from the cold mold. Without such isolation means, the contact of the cold mold with the hot manifold would result in undesirable heat transfer to the mold. This, in turn, could detrimentally impact upon the article formation characteristics of the mold by slowing article solidification times. It would also result in the need for the provision of additional heat input to the metal surrounding the runner channel in order to avoid undesirable solidification of the melt material flowing therethrough.

Such insulation is generally accomplished by the provision of support pads located between the lower manifold surface and the upper mold surface. These support pads provide spaced structural contact between the hot manifold and the cold mold. They are also made of materials having a low thermal conductivity. Accordingly, an air gap is created between the lower surface of the manifold and the upper surface of the mold. That air gap and those support pads act to substantially thermally isolate the manifold from the mold.

In addition, air gaps and/or other insulating means are typically provided between the bushings and the mold. More particularly, the bushings commonly extend downwardly from the lower surface of the manifold, through the air gap created by the support pads, and thence into a bore extending into the upper surface of the mold. A small gate (opening) extends from the base of the bore to the article formation cavity of the mold. Further, the bushing is so sized and mounted that it is spaced from the side wall and base of the bore.

In this connection, it is well known in the art that the relative geometrical configurations of, and composition of, the bushing tip and the base of the bore in the mold are to be carefully controlled. These features allow the mold to pull heat from the gate area during reduced melt pressure portions of the injection molding cycle in a manner which produces an approximation of the desired, axially extending thermal gradient (profile) in the gate area. As will be described in greater detail below, it is this thermal profile in the gate area which allows the "vestige" to break without stringing or drooling.

In addition, features, such as (i) mounting slots for the proximal ends of the bushings in association with the manifold, or (ii) centering protrusions associated with the bore in the mold adapted to engage the bushing proximally of the gate area, are often incorporated into the overall apparatus design. The mounting slots allow the bushing to remain centered relative to the bore despite thermal expansion and/or contraction of the various elements of the apparatus. The centering protrusions, on the other hand, assure the alignment of the runner channel with the gate. The contact area between the protrusions and the bushing, however, is kept small. Further, that contact area is spaced from the gate area. These features minimize the detrimental effects of direct contact between the bushing and the mold.

In some cases, bushings have been developed which include a bore defining portion having a small gate at the bottom thereof. In such cases, the mold maker is relieved of the responsibility of creating components which must be machined to very close tolerances for receipt of the bushings. Instead, the mold is simply provided with roughly sized bores defining small gates to the article formation cavities at the bottom thereof. The bore defining portions of the bushings are then press-fit into, or otherwise secured within, the rough bores so as to effectively become part of the mold.

Thermal control in the gap between the output of the bushing runner channel and the gate input (the so-called "gate area") in "true" runnerless injection molding apparatus during the low melt pressure portion of the injection molding cycle is critical to the operation of the apparatus. Without such control, undesirable stringing of the plastic material at the break point between the molten material and the so-called "vestige" of the formed article, drooling of melt material from the gate output subsequent to formed article ejection from the mold and/or freeze-off of the gate area may take place. These events may result in ruined parts, material waste, the need for unnecessary trimming operations and/or undesirable machine down time to free the runner channel of frozen (i.e., solidified) melt material. Further, the size of the gate and melt injection pressure must be so selected that the article formation cavity of the mold may be completely filled without defects during an appropriately selected cycle time period. In addition, changes in the color of the melt should be possible without disassembly of the apparatus to remove material of the color previously injection molded thereby.

Several alternatives have been utilized heretofore in the art in an attempt to provide the required thermal gate area control in "true" runnerless injection molding apparatus. In each of these alternatives, the primary goal has been to control the axial and radial temperature gradient (profile) in the gate area during the low melt pressure portion of the injection molding cycle. Specifically, in the ideal case, the axial temperature gradient (profile) between the output of the bushing runner and the input of the gate subsequent to each injection "shot" of melt material should be such as to allow gradual cooling for a short distance from the runner output under the influence of the heated bushing. Thereafter, a sharp temperature drop followed by further gradual cooling under the influence of the cold mold should be provided. Such a temperature gradient (profile) allows the so-called "vestige" of melt material extending outwardly from the article formed by the mold to break cleanly in the gate area.

More particularly, the article should not draw a "string" of melt material therewith upon its removal from the mold. In addition, melt material should not "drool" from the gate after the removal of the article from the mold. At the same time, however, the gate orifice diameter must meet the article formation cavity fill requirements of the mold. Further, in order to avoid material clogging, the gate orifice must be sized so as to permit the passage of melt material therethrough without exceeding the allowable shear rate of the material being processed.

Since the resins which are typically injection molded fall into two general categories—Amorphous and Crystalline—it will be understood that no single gate design will effectively handle every material. Amorphous materials have no specific melting point, but become easier flowing with increases in temperature. They have a wide processing window and require a dramatic drop in temperature at the critical vestige break point region of the gate area. If this region is too hot, stringing and/or drooling will occur. If it is too cold, gate freeze-off will occur. Crystalline materials, on the other hand, have a sharply defined melting point. Accordingly, higher temperatures in the gate area must be maintained in order to avoid freeze-off. At the same time, however, too high temperatures must be avoided in order to prevent stinging and/or drooling.

In one of the above-mentioned alternatives to the solution of these problems, the melt material exiting the bushing under mold filling pressure is allowed to flow both (i) into the article forming cavity of the mold through the gate and (ii) into the gap between the bushing and the bore of the mold. In this case, the melt material injected into the space between the bushing and at least the lower portion of the bore acts as an insulator. Further, it has been found that by appropriately selecting the materials and configuration of the distal end of the bushing and the gate, the desired temperature gradient in the gate area may be approximated. In some cases, it has been found that computer modeling by a process commonly known as finite element analysis may be used to advantage in making such selections.

Melt material in the gap between the bushing and the bore, however, tends to degrade over time. Further, the melt material adjacent to the hot outer surface of the bushing remains in a substantially molten condition while that adjacent to the cold mold tends to solidify. Accordingly, molten, degraded material may migrate into the main melt stream flowing into the article formation cavity of the mold. This may ruin one or more articles subsequently formed in the mold.

As briefly alluded to above, the pressure applied to the melt stream varies over the cycle of the system. More specifically, the injection cycle includes an injection period during which substantial pressure is applied to the melt stream so as to force it into the article formation cavity, and into the space between the bore and the outer surface of the bushing. Thereafter, this injection pressure is reduced while (i) the article is solidified, (ii) the mold is opened, (iii) the article is removed from the mold, (iv) a skin is formed across the gate after the removal of the article and the "vestige" attached thereto, and (v) the mold is reclosed. During this lower pressure time period, some of the unsolidified melt material located between the bushing and the cold bore wall tends to flow back (i.e., "decompress") into the gate area. Accordingly, upon the next increase in pressure, this degraded material may be forced into the article formation cavity of the mold along with the new "shot" of virgin melt. This reciprocating pumping action (i.e., compressing melt material into the gap between the bore and the mold under pressure and then reducing the pressure so as to allow some of the material between the bore and the bushing to flow back into the gate area) takes place during each mold cycle. It also creates an undesirable potential for damaging, or ruining, many molded articles.

The foregoing is particularly problematic when it is desired to change the color of the melt. Specifically, during low pressure portions of the injection molding cycle, the above-described reciprocating pumping action tends to draw melt of the original color located between the outer surface of the heated bushing and the bore into the main melt stream of the new color. This ruins articles molded from the melts so combined. Thus, mold disassembly to remove the melt of the original color from the gap between the bushing and the bore in the mold is often required in order to effectuate a melt color change. Obviously, this is time consuming, inefficient and expensive.

Further, degradation of the solidified melt along the bore walls may cause pieces thereof to flake or break off so as to be available for migration into the gate area. Such flakes or particles tend to ruin a molded article and/or to clog the internal molding cavity if they are allowed to flow through the gate. Further, they may obstruct the gate itself. In the latter case, disassembly of the system is required to clean out the gate. Still further, the insulation (i.e., resistance to heat conduction) properties of the melt material are less effective than air, but more effective than metal. Accordingly, the use of such materials as insulators does not provide an optimum temperature gradient (profile) in the gate area of the system.

In view of the foregoing, various alternative solutions have been adopted in an attempt to solve the above-described problems. In one such alternative, the gap between the bushing and the bore has been filled with materials which exhibit high heat stability and resistance to thermal break down. These materials, however, still tend to crack and/or otherwise deteriorate under the forces of thermal expansion and contraction and/or under the applied pressures exerted thereupon by the melt flowing through the gate area. Hence, flakes or particles of such materials can enter the melt flow, and ruin or damage molded articles and/or obstruct the gate. Further, melt material may enter the cracks in such materials during the high pressure phase of the injection molding cycle so as to accelerate the break down thereof and reduce their insulative properties. Still further, no such material has yet been found which does not have significant thermal transmission (conductivity) properties. Thus, such materials tend to be less effective insulators than air, and to draw significant amounts of heat from the bushing toward the mold. Of course, this results in the need to supply additional heat input to the bushing, and reduces the efficiency of the apparatus.

Finally, solid mechanical seals (usually metallic in composition) have been used between the bushing and the bore in the region immediately surrounding the gate area. Such solid mechanical seals have also proven to be unsatisfactory. More particularly, such seals suffer from thermal and mechanical problems. For example, the thermal expansion coefficients and tolerances of such seals must be very carefully determined according to both the geometry of the apparatus into which they are to be placed and the operating parameters of that apparatus. If this is not done, or is done incorrectly, excessive forces may be applied to the gate area. Since the dimensions of the walls forming the gate area are typically quite small and injection pressures are fairly large, the application of such forces to such mechanical seals may "blow out" the gate area and/or the seal. Such a "blow out" requires substantial capital investment for replacement or repair, and/or significant down time to the molder. Further, such solid seals typically have significant heat conductivities and, therefore, cannot provide the desired temperature gradient (profile) for efficient gate operation.

SUMMARY OF THE INVENTION

Accordingly, it is an object of the present invention to provide an improved, open bore type, injection molding apparatus wherein the axial and radial temperature gradients (profiles) in the gate area during the low pressure portions of the injection molding cycle are optimized.

It is also an object of the invention to provide an improved, open bore type, injection molding apparatus wherein the gap between the bushing and a bore in a mold is resiliently sealed substantially adjacent the gate area so as to create an air gap between the bushing and the mold along the majority of the length of the bushing.

Further, it is an object of the present invention to provide an improved, open bore type, injection molding apparatus wherein the gap between the bushing and a mold substantially adjacent the gate area is sealed in a manner which minimizes heat transfer from the bushing to the mold.

Still further, it is an object of the invention to provide an improved, open bore type, injection molding apparatus wherein the problem of migration of degraded melt material into and/or through the gate area is minimized.

Yet another object of the invention is to provide an improved, open bore type, injection molding apparatus including simple and inexpensive high pressure seal for use substantially adjacent to the gate area.

Yet another object of the invention is to provide an open bore type bushing which includes a seal at its distal tip, the seal being affixed to the bushing and adapted to sealingly engage a bore in a mold surrounding a gate so as to withstand pressures applied thereto during injection molding operations without significant heat transfer therethrough from the bushing to the mold.

These and other objects of the invention are accomplished by the provision of an open bore type injection molding apparatus including an elongate, open bore bushing and a resilient, high pressure resistant sealing means having low thermal conductivity. The bushing is adapted to convey plastic melt from the output of a runner channel in a hot manifold through a bore in a mold to the input of a gate in the conventional manner. The gate is located at the bottom of the bore and communicates with an article formation cavity of the mold. The sealing means is adapted to substantially thermally isolate the bushing from the mold in the area surrounding the gate. It is also adapted to withstand pressures exerted by melt material flowing through the system during injection molding operations and/or by the thermal expansion and contraction of the apparatus components.

More particularly, the bushing is made of a highly heat conductive metal, and includes means for applying heat thereto so as to maintain the temperature of the bushing at the temperature of a melt flowing therethrough. Specifically, the bushing includes a proximal end defining a proximal opening, a distal end defining a distal opening, walls defining a lumen connecting the proximal opening to the distal opening, an outer surface and means for heating the walls. The outer surface defines a tip portion adjacent the distal end of the bushing. The heating means, for example, may be heat pipes which derive their heat from the hot manifold, or electrical resistance heaters which derive their input heat energy independently of the manifold.

In a preferred embodiment, the bushing is designed to extend from the output of a runner channel in a hot manifold, through an air gap located between the hot manifold and a cold mold, and into the volume defined by the walls and the base of a bore extending into the upper surface of the cold mold. The configuration of the bushing and its alignment with the bore in the mold is such that the bushing resides in spaced relation to both the side wall and the base of the bore. Further, the distal opening is disposed in axially aligned, spaced relation to the gate in the mold. Still further, the tip portion of the bushing defines seal mounting means. The seal mounting means are spaced from and surround the distal opening in the bushing. As will more fully hereinafter appear, it is contemplated that the seal engagement means may comprise a groove, a surface area substantially parallel to the longitudinal axis of the bushing or some other means adapted for securing the sealing means to the distal tip portion of the bushing.

The seal includes a member made of a metallic alloy or like material which may be substantially less heat conductive than the material used to form the bushing. Further, the sealing member is a thin-walled, substantially resilient structure, and may be adapted for engagement by the seal mounting means so as to be carried by the bushing. The sealing member extends a preselected distance outwardly from the tip portion of the bushing so as to form a sealing engagement along a limited contact area located on the adjoining bore in the mold when the bushing is operatively disposed therein.

More particularly, in one preferred embodiment, it is contemplated that the sealing member will include at least one portion having a partially open, generally C-shaped or arc-shaped transverse cross-section. Accordingly, the sealing member may be formed as an O-ring, or as an O-ring defining spaced, aligned openings in its surface. Similarly, the sealing member may be formed as an O-ring having an annular portion removed from its inner wall so as to form a C-shaped or arc-shaped cross-sectional structure. Further, the sealing member may have a generally V-shaped cross-section, if desired. In addition, the sealing member may be formed as a flexible length of hollow tubing or a flexible length of material having the desired generally C-shaped or arc-shaped or V-shaped transverse cross-section. Other possible configurations also will occur to those skilled in the art in view of the following detailed description of the present invention.

It is contemplated that the sealing member will, in the unassembled configuration of the apparatus, extend slightly farther from the tip portion of the bushing than the width of the gap between the seal engagement means and the adjoining portion of the bore in the mold when the apparatus is in its assembled configuration. In this regard, it will be understood by those skilled in the art that the configurations of the tip portion of the bushing and of the bore will usually correspond to each other so as to maintain the gaps between the various portions thereof substantially constant when the apparatus is in its assembled configuration.

Accordingly, when the bushing is inserted into the bore in a mold to its desired location, the sealing member will be slightly compressed between the tip of the bushing and the adjoining portion of the bore. In particular, in the compressed configuration the outwardmost portion of the sealing member will sealing contact the bore of the mold. The area of this contact is maintained as small as possible while still sealing the gap between the bushing and the bore in the mold against the passage of molten material therethrough. The minimal nature of this contact area with the bore of the mold minimizes the transmittal of heat from the bushing to the mold. Further, the open side of the transverse cross-section of the seal will be located across the gap between the bushing and the bore facing generally distally.

As molten plastic is injected through the bushing under pressure designed to fill the article formation cavity of the mold, some of that molten material will fill the volume defined by the tip portion of the bushing, the base of the bore and the sealing member. Even under the substantial applied pressures required for the injection of molten material through the gate into the article formation cavity of the mold, however, molten material will be prevented by the sealing member from advancing upwardly along the outer surface of the bushing into the gap between that surface and the walls of the bore. This result is due to (i) the narrow nature of the gap between the tip portion of the bushing and the bore, (ii) the resiliency of the sealing member, and (iii) the inclusion as part of the seal engagement means of a portion adapted to restrict movement of the seal proximally along the outer surface of the bushing.

More particularly, it will be understood that in one preferred embodiment of the invention, the seal engagement means may include a annular surface in the tip portion of the bushing substantially parallel to its longitudinal axis. This annular surface may be formed, for example, by removing a portion having a generally right triangular wedge shaped transverse cross-section adjacent to the joinder of the side wall and tapered or curved distal end of the bushing. The inner diameter of the ring-shaped seal is selected to be slightly smaller than the diameter of the annular surface. Therefore, the seal may be surface compression fit around the annular surface, and retained in position by its resilient, elastic properties. This configuration of the bushing/seal may be located within a mold bore having a conventionally tapered or curved base portion so as to make sealing contact therewith along an annular area surrounding the gate having as small a width as possible.

Alternatively, this bushing configuration may be mated with a circular land area perpendicular to the longitudinal axis of the bore located between its side wall and the tapered or curved portion of its base. In the latter configuration, cylindrical contact areas with the seal of will be formed at least along the seal engagement surface and along annular areas having as small a width as possible on the radially adjoining side wall of the bore. Specifically, the annular contact areas on the bore are maintained as small as possible while still sealing the gap between the bushing and the bore against the passage of melt. Thermal expansion of the bushing may also cause similar contact areas to be formed along the land of the bore and a corresponding land area of the bushing which extends radially outwardly from the upper edge of the annular seal engagement surface. In either event, the land area of the bushing will prevent the seal from being "blown out" under applied melt pressures.

It has been found that the temperature profile in the gate area during low pressure portions of the injection molding cycle in the present invention is much improved over that achievable with the prior art alternatives. Drooling and/or stringing of the melt are, therefore, minimized. Further, since the amount of melt passing upwardly around the bushing from the gate area is minimized, color changes of the melt are facilitated. Specifically, less potentially degraded and/or different color material is present between the bushing tip and the base of the bore to decompress into subsequent "shots" of "virgin" melt material than was present in prior systems. Similarly, the chance of degraded material or flakes (pieces) of degraded solidified melt or other insulating material entering the gate area so as to ruin formed articles or to clog the gate is minimized. Further, the resiliency of the seal effectively absorbs applied melt pressures and the thermal expansion of system parts adjacent to the gate area, either of which could otherwise "blow out" the seal and/or the gate area of the mold.

The apparatus of the present invention, therefore, represents a substantial advance in the art which is useful regardless of the orifice diameter of the gate and other parameters necessitated by the melt material selected, the cycle time desired and other factors which are determinative of the particular gate characteristics selected. Substantial savings in materials, ruined parts and machine down time are also envisaged as a result of the adoption of the present invention in open bore type injection molding systems.

It will also be understood that other alternative preferred embodiments are contemplated. For example, the seal engagement means may be a slot-like groove in the tip portion of the bushing surrounding its distal opening. In this embodiment, one side edge of a C-shaped or arc-shaped or V-shaped sealing member is affixed in engagement between the side walls of the groove. As the seal is compressed between the bushing tip and a correspondingly curved or tapered surface of the base of the bore, the lower side edge of the seal will engage the base of the bore and will tend to slide slightly toward the gate. Thereafter, as the melt material is forced between the tip of the bushing and the base of the bore, the seal is forced by the melt against the base of the bore and pushed radially outwardly away from the gate area. The resilience of the walls of the sealing member, combined with the frictional drag of the outer side edge of the sealing member against the base of the bore and its engagement with the groove, however, prevent the seal and/or the gate from "blowing out" under the applied pressure.

At the same time, the material of and the thin-walled nature of the sealing member, along with the minimal area of contact between the seal and the mold, substantially prevent conduction of significant amounts heat therethrough from the heated bushing to the cold mold. Effectively, therefore, the sealing member thermally insulates the bushing from the mold adjacent the gate area. The majority of the length of the bushing, therefore, remains separated from the bore walls by an air gap. Further, the quantity of molten material allowed to flow into the gap between the distal end of the bushing and the base of the bore adjacent the gate area will be very small.

BRIEF DESCRIPTION OF THE DRAWINGS

These and other features, objects and advantages of the present invention will become clear to those skilled in the art in view of the following detailed description of a preferred embodiment of the invention. The following detailed description is to be read and construed in conjunction with the appended drawings wherein like reference numerals are used to indicate like elements throughout, and wherein.

DETAILED DESCRIPTION OF PREFERRED EMBODIMENTS

Figure 1:
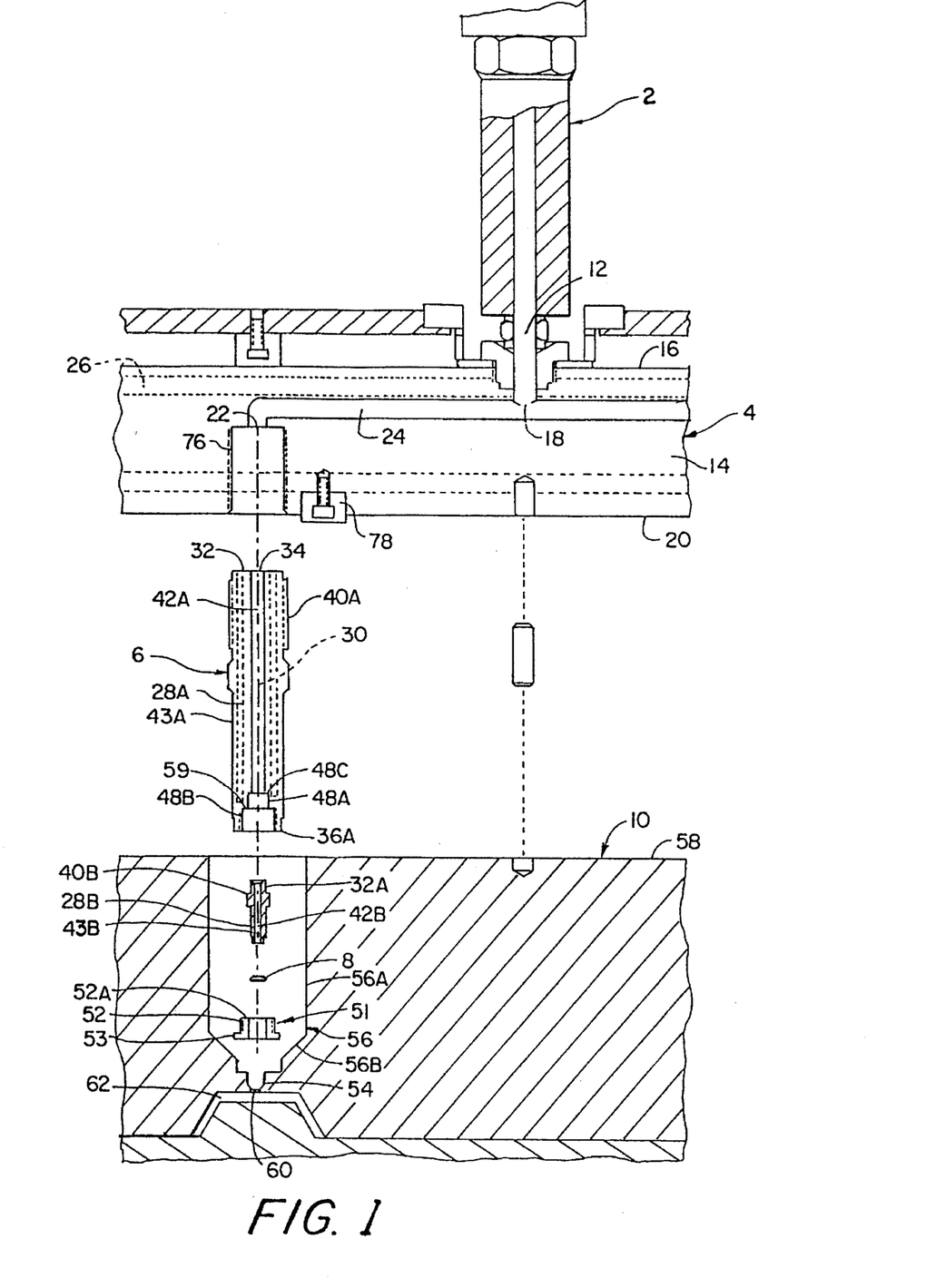
FIG. 1 is an illustrative, exploded side elevational view, partially cut away, of an improved hot runner injection molding apparatus in accordance with the present invention.

Referring now to the drawings (wherein some of the cross-hatching of sectional views has been omitted for clarity), and particularly to FIG. 1, there is shown an exploded view of an improved, open bore, hot runner injection molding apparatus in accordance with the present invention. This apparatus includes a source of molten material 2, a manifold 4, a bushing 6, sealing means 8 and a mold 10.

More particularly, the source of molten material 2 is adapted to supply molten material to its output orifice 12 under variable pressure. Accordingly, it will be understood by those skilled in the art that a plastic injection molding machine will supply preselected quantities of molten material to the output orifice 12 of the source 2 under preselected pressures at preselected temperatures and at preselected intervals.

The manifold 4 comprises a block 14 of highly heat conductive metal having an upper surface 16 defining at least one first opening 18, a lower surface 20 defining at least one second opening 22, and at least one runner channel 24 connecting one of said first openings 18 to one or more of said second openings 22. The output orifice 12 of the source 2 communicates with the first openings 18 in the manifold 4 so as to allow molten material from the source 2 to flow therefrom into and through the runner channels 24. In addition, the manifold 4 includes heating means, representatively shown as cartridge heaters 26, for maintaining the manifold block 14 at, or above, the temperature required to maintain melt material contained therein in a molten state.

The bushing 6 (best seen in FIG. 2) generally comprises (i) an elongate member 28 having a longitudinal axis 30, (ii) an upper end 32 defining a third opening 34, (iii) a lower end 36 defining a fourth opening 38, (iv) a wall 40 defining an internal lumen 42 connecting third opening 34 to fourth opening 38 and (v) an outer surface 43. Outer surface 43 defines a tapered or curved tip portion 44 which extends outwardly and proximally from fourth opening 38. Further, tip portion 44 defines seal engagement means 46.

As will be readily recognized by those skilled in the art, the bushing 6 may be formed either as a unitary structure or as a combination of interlocking elements. In the particular embodiments shown in the drawings, the elongate member 28 includes a first portion 28a and an insert portion 28b.

Figure 2:
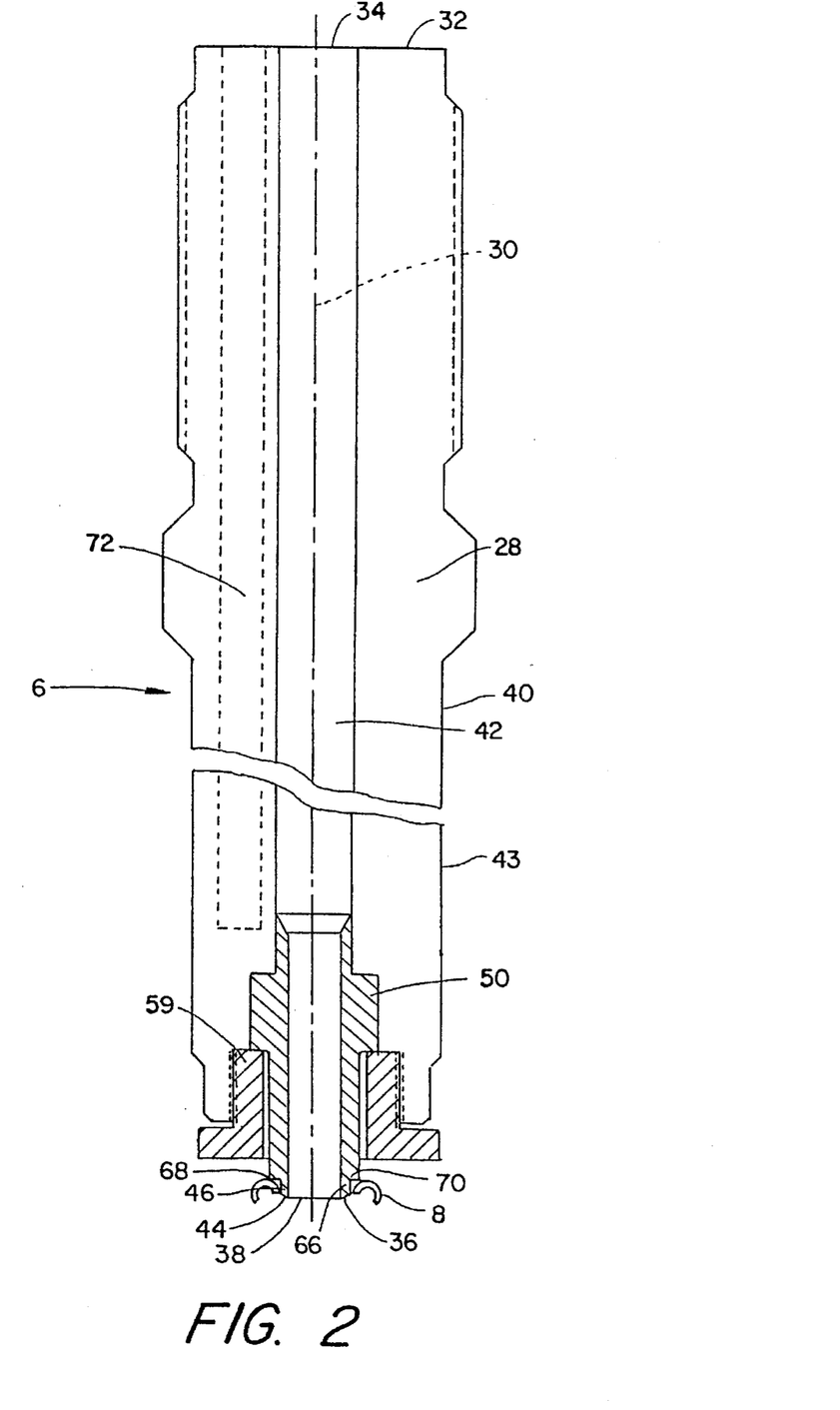
FIG. 2 is an illustrative, sectional side view of a hot injection bushing in accordance with the present invention and suitable for use in the apparatus shown in FIG. 1.

First portion 28a includes (i) upper end 32, (ii) a lower end 36a, (iii) an upper portion 40a of wall 40 defining an upper portion 42a of internal lumen 42, (iv) an upper portion 43a of outer surface 43, (v) a first counterbore 48a extending axially into lower end 36a surrounding upper portion 42a of lumen 42, and (vi) a second counterbore 48b having a larger diameter than first counterbore 48a, and extending axially into lower end 36a surrounding first counterbore 48a.

Insert portion 28b, on the other hand, includes (i) and upper end 32a, (ii) lower end 36, (iii) a lower portion 40b of wall 40 defining a lower portion 42b of internal lumen 42, and (iv) a lower portion 43b of outer surface 43. Further, the upper portion 50 of insert portion 28b is sized to make a surface compression fit with the portion 48c of first counterbore 48a which extends upwardly from second counterbore 48b. The engagement of portion 50 with portion 48c is made such that the opening of lower portion 42b of internal lumen 42 into upper end 32a is in axial alignment with the opening of the upper portion 42a of internal lumen 42 into the upper end of first counterbore 48a. The lower portion 43b of outer surface 43, however, defines a substantially smaller transverse cross-section than the upper portion 43a of outer surface 43.

The last described configuration has the advantage that a centering element 51 including a cylindrical projection 52 extending upwardly from the inner periphery of an annular base 53 may be located at the joinder of a larger diameter portion 56a and a smaller diameter portion 56b of a bore 56 which extends into the upper surface 58 of mold 10. Element 51 will typically be formed of titanium or some other metallic material having low thermal conductivity. Lower portion 43b of outer surface 43 of insert portion 28b extends through element 51 so that lower end 36 resides in proximity to gate 60. Further, element 51 serves to align tip 44 of bushing 6 in bore 56. Specifically, projection 52 is inserted into second counterbore 48b so that its upper edge 52a abuts the shoulder 59 formed at the joinder of first and second counterbores 48a, 48b.

It, therefore, will be seen that the transverse cross-sections of bushing 6 and bore 56 may vary correspondingly along their respective axial lengths without departing from the present invention in its broadest aspects. More specifically, the basic structure of the sealing means 8; its attachment to tip 44 of bushing 6 so as to extend outwardly therefrom surrounding fourth opening 38 in lower end 36; and its small, annular, compressive sealing and pressure resistant contact with the adjoining portion of bore 56—all as discussed in detail hereinbelow—are not effected by whether the bushing 6 is a unitary or a multipart structure. Accordingly, bushing 6 and the bore 56 will hereinafter be discussed generically, without specific reference to their varying transverse cross-sectional configurations shown in the drawings appended hereto. It will also be understood that the relationships hereinafter set forth regarding bore 56 and bushing 6 apply also to insert portion 28b and centering element 51 in combination with the lower portion 56b and base 54 of bore 56.

In the preferred embodiments, therefore, it will be seen that seal engagement means 46 is a groove extending into wall 40. The groove extends circumferentially around tip portion 44 in spaced relation to fourth opening 38. In the preferred embodiments illustratively shown in FIGS. 4 and 5, the groove comprises a substantially L-shaped cut-out located at the joinder of tip portion 44 and the portion of the outer surface 43 which is parallel to longitudinal axis 30. Specifically, the L-shaped cut-out includes an annular wall (surface) 66 substantially parallel to longitudinal axis 30 and a land 68 extending radially outwardly from the proximal edge 70 of annular wall 66. In the embodiment shown in FIG. 6, however, the sealing means 46 comprises a slot in tip portion 44 surrounding fourth opening 38.

Insert portion 28b is made of rigid, highly heat conductive metal such as beryllium/copper. In addition, means 72 are provided for maintaining the temperature of bushing 6 at the temperature of the melt coming from the hot manifold 4. These heating means 72 (the alternatives of which are not shown for purposes of clarity) may include heat pipes contained within, and running along substantially the entire longitudinal length of, walls 40 of bushing 6 so as to maintain those walls at the temperature of manifold 4. Electrical resistance type cartridge heaters might be used in place of the heat pipes. Further, electrical resistance type heater bands might be positioned around the bushing at longitudinally spaced locations for the same purpose.

The sealing means 8 may take any one of several forms within the contemplation of the invention (see FIGS. 3A–3F). In each case, sealing means 8 comprises a thin-walled element 74 made of metallic alloy such as the stainless steel, Inconel, i.e., a trademark for a metallic alloy containing about 76 percent nickel, about 15 percent chromium and about 9 percent iron, or some other preferably metallic material having a low thermal conductivity. As used herein, the term "thin-walled" is contemplated to mean a wall thickness on the order of between about 0.006 inches and about 0.010 inches.

Figure 3A:
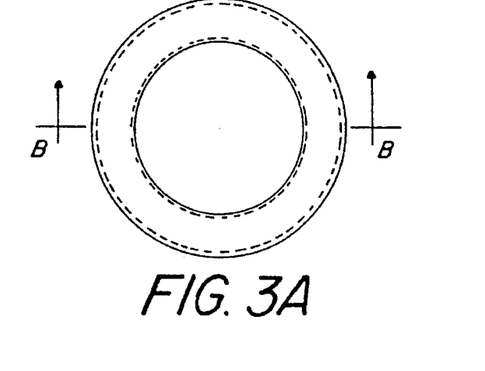
FIG. 3A is a top elevational view of an O-ring seal in accordance with the present invention.
Figure 3B:
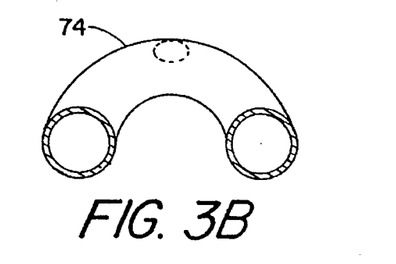
FIG. 3B is an illustrative, perspective view of the O-ring seal of FIG. 3A shown in partial section taken along the line B—B of FIG. 3A wherein the optional presence of spaced, aligned vent holes in the O-ring wall are shown in phantom.
Figure 3C:
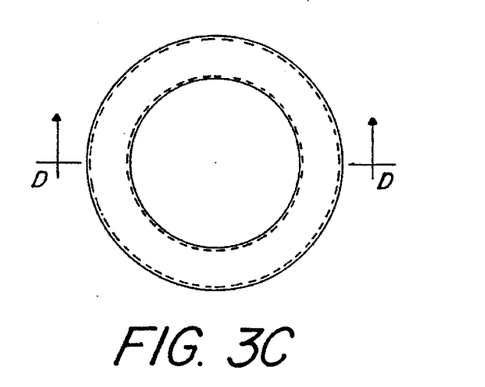
FIG. 3C is a top elevational view of a seal in accordance with the present invention having a C-shaped or arc-shaped transverse cross-section.
Figure 3D:
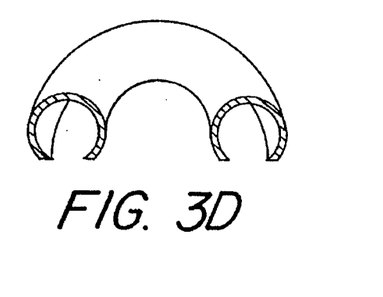
FIG. 3D is an illustrative, perspective view of the seal of FIG. 3C in partial section taken along the line D—D of FIG. 3C.

More particularly, the sealing means 8 includes a thin-walled, resilient element 74 having at least a portion along its length having a substantially O-shaped, C-shaped, arc-shaped or V-shaped transverse cross-section. Element 74 may be formed as (i) a hollow, generally tubular O-ring (FIGS. 3A–3B); (ii) an O-ring having spaced and aligned portions of its wall removed (FIG. 3B, phantom lines); (iii) an O-ring having an annular portion of its wall removed (FIGS. 3C–3D); (iv) a length of flexible, hollow tubing permissably having axially aligned portions of its wall located adjacent one another removed (FIG. 3E); or (v) a length of flexible material having a substantially arc-shaped or V-shaped transverse cross-section (FIG. 3F). Other similar sealing element configurations are also contemplated to be within the skill of the art in view of this disclosure, and hence to be within the scope of this invention in its broadest aspects.

Figure 4:
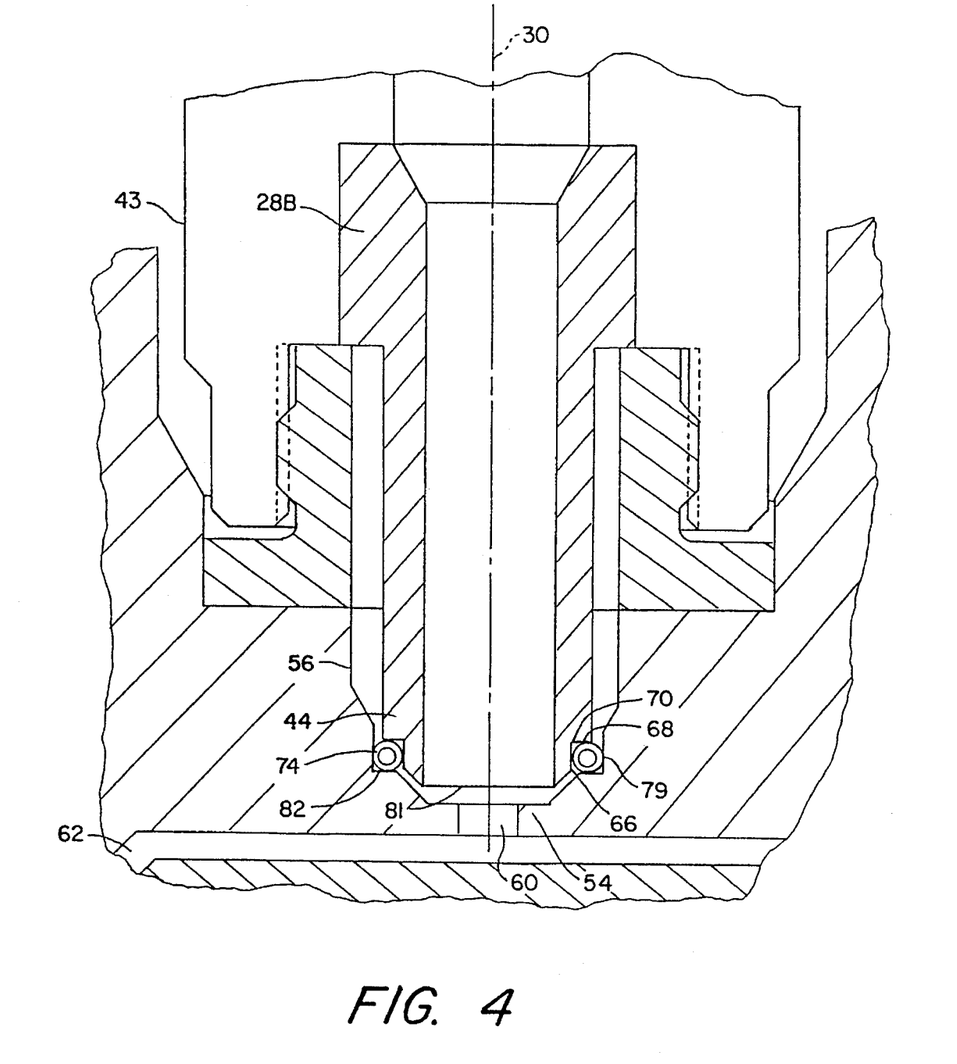
FIG. 4 is an illustrative, sectional, side view, partially cut away, of a fully assembled improved hot runner injection molding system in accordance with the present invention utilizing an O-ring seal in the space between the bushing and the bore of a mold.
Figure 5:
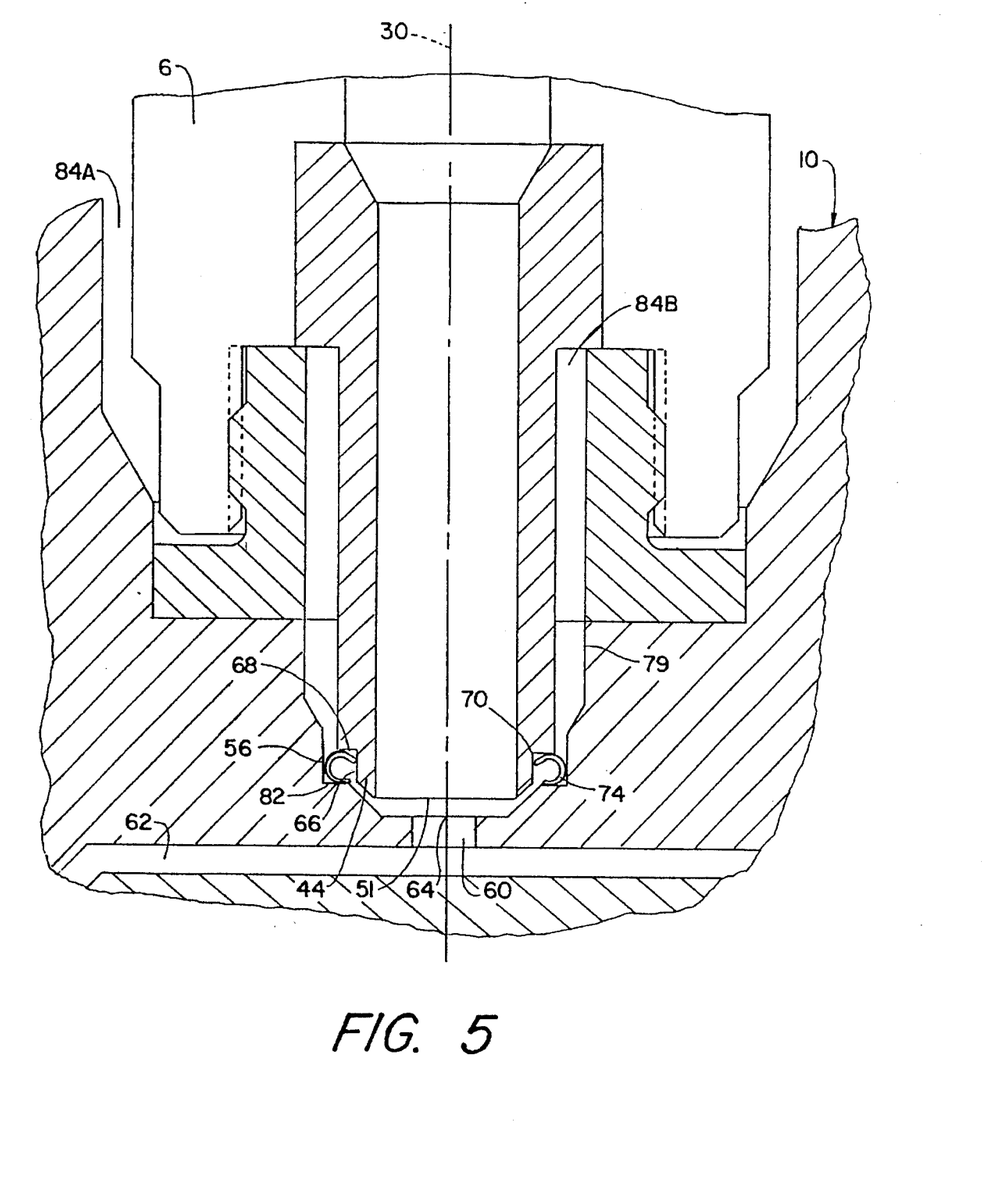
FIG. 5 is an illustrative, sectional, side view, partially cut away, of another fully assembled improved hot runner injection molding system in accordance with the present invention utilizing a generally C-shaped or arc-shaped transverse cross-section sealing member in the space between the bushing and the bore of a mold.

As will be seen by reference to FIGS. 2, 4 and 5, the cross-section of sealing member 74 is larger than the cross-section of the groove, and the inner diameter of sealing member 74 is slightly smaller than the smallest diameter of the groove. Accordingly, sealing member 74 is expanded radially during the course of its disposition within the groove against annular surface 66. Thus, the seal may be affixed within the groove with the open portions of its wall (if present) facing generally distally. This may be accomplished by simply compression-fitting the wall of the sealing member 74 against annular wall 66. When this is done, the seal will elastically yield for entry into the groove, and thereafter be held in position by the tendency of the seal to return to its original configuration.

Figure 3E:
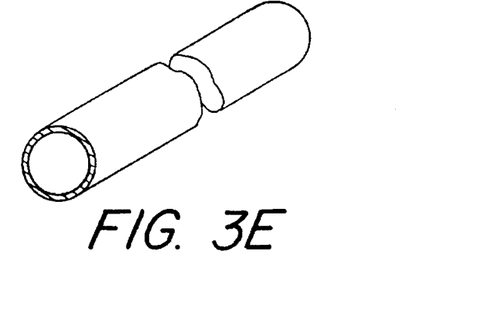
FIG. 3E is an illustrative, perspective view of a flexible length of tubing suitable for use as a sealing member in accordance with the present invention.
Figure 3F:
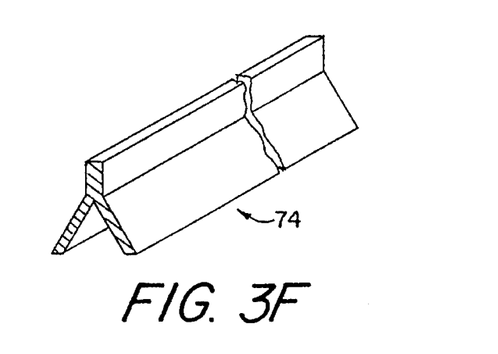
FIG. 3F is an illustrative, perspective view of a flexible length of material having a generally V-shaped transverse cross-section suitable for use as a sealing member in accordance with the present invention.
Figure 6:
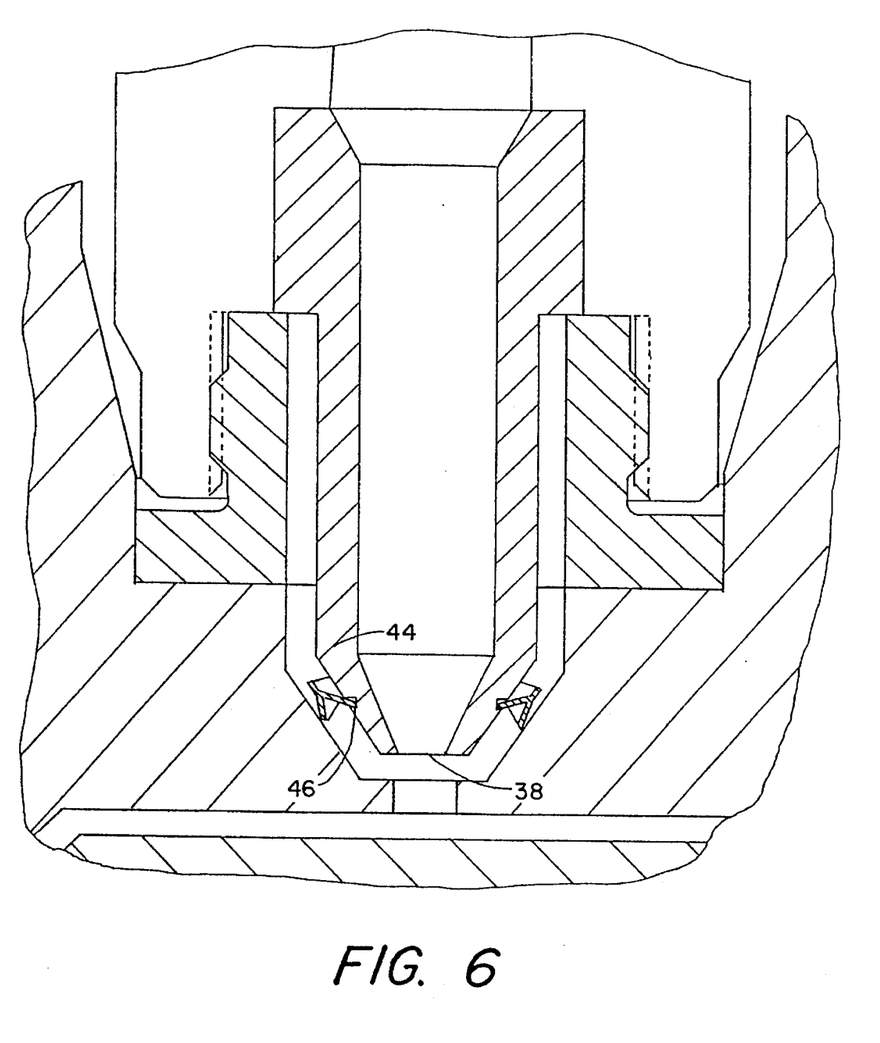
FIG. 6 is an illustrative, sectional, side view, partially cut away, of another a fully assembled improved hot runner injection molding apparatus in accordance with the present invention utilizing a sealing member having a generally C-shaped or arc-shaped transverse cross-section in the space between the bushing and the bore of a mold.

The seal embodiments of FIGS. 3E and 3F are representative of the fact that sealing member 2 may be formed as a ring or as a length of material. Specifically, in those cases where sealing member 74 is a length of material, sealing member 74 may be cut to a length equal to the length of the central circular axis of the groove (in this alternative a slot as shown in FIG. 6). Thereafter, starting at one end of the length of sealing member 74, and progressing therealong, one edge of its cross-section is forced into the slot. Thereafter, the sealing member 74 may glued or otherwise affixed in the slot.

The bushing 6 with the sealing member 74 located in the groove is then ready for location within bore 56 in upper surface 58 of mold 10. As mentioned previously, upper end 32 of bushing 6 is attached to hot manifold 4 such that third opening 32 communicates with second opening 22 in lower surface 20 of manifold 10. In practice this is often accomplished by screwing or otherwise securing the portion of bushing 6 adjacent upper end 32 within a counterbore 76 surrounding the opening 22 into lower surface 20. If desired, the joinder of hot manifold 10 to hot bushing 6 may be sealed with a gasket-like member (not shown) to prevent flashing of the melt material therebetween during injection molding operations. Further, means (not shown) are often provided for compensating for the thermal expansion and/or contraction of the various elements of the system. These elements assure the maintenance of the alignment of the bushings 6 in bores 56.

Thermally resistant support pads 78 are located between lower surface 20 of hot manifold 10 and upper surface 58 of cold mold 10. Support pads 78 serve to thermally and mechanically separate hot manifold 4, which typically operates at between about 350° and about 750° F., from cold mold 10, which typically operates at between about 30° and about 200° F. Bushings 6, therefore, are suspended substantially centrally within bores 56 in upper surface 58 of mold 10. This suspension is such that lumen 42 is in alignment with gate 60 connecting base 54 of bore 56 with the internal, article formation cavity 62 of mold 10. It is also such that the outer surface 43 is spaced from wall 79 of bore 56, and base 54 (which is correspondingly contoured to tip portion 44) is closely spaced to tip portion 44. Specifically, the spacing between tip portion 44 and base 54 of bore 56 is selected to be smaller than the distance seal means 8 extends outwardly from its associated groove (i.e., on the order of less than about 0.10 inches).

Figure 7:
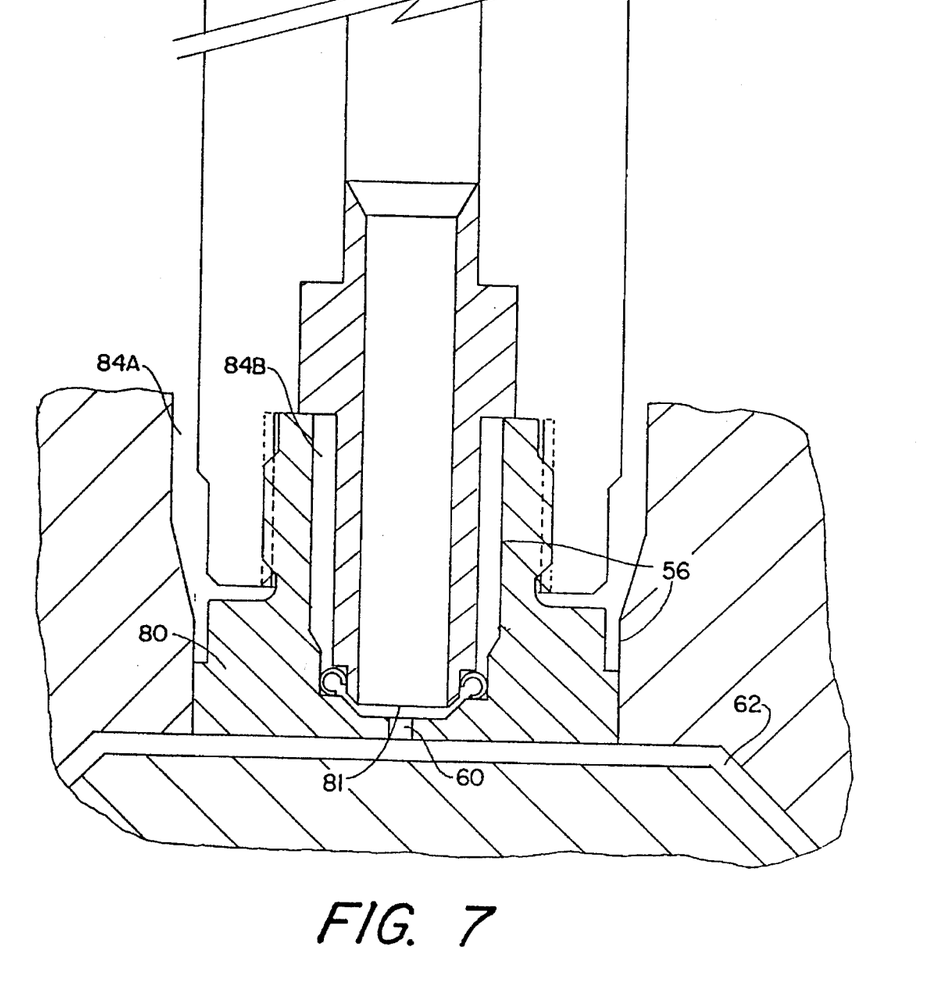
FIG. 7 is a sectional side view, partially cut away, of another fully assembled improved hot runner injection molding apparatus in accordance with the present invention including a bore defining member adapted for insertion into a corresponding cavity formed in the outer surface of a mold.

It will be understood that bore 56 may be formed in mold 10 directly. It might also be formed two portions, one in mold 10 and the other in an element 80 adapted to tightly fit within bore 56 so as to effectively become part of mold 10 as shown in FIG. 7. Further, it might also be formed in a plate (not shown) adapted to be placed on top of mold 10 so as to substantially constitute an extension of the mold without departure from the invention in its broadest aspects.

It will, therefore, be understood, that in the assembled condition, the apparatus compresses the sealing means 8 either (a) between annular surface 66 and the base 54 or side wall 79 of bore 56 as shown in FIGS. 4 and 5; or (b) between base 54 of bore 56 and a slot as shown in FIG. 6, so as to seal the gap therebetween close to the gate area 81. In the alternative shown in FIGS. 4 and 5, thermal expansion of the bushing may also cause the corresponding land areas 68, 82 of bushing 6 and mold bore 56 respectively to be brought into small area, sealing contact with the sealing member 74.

The majority of the length of bushing 6 is therefore separated from cold mold 10 by highly insulating (i.e., low thermal conductivity) air gaps 84a, 84b. Further, due to its composition, thin walled structure, and small contact area with the bore, the sealing means 8 conducts very little heat between hot bushing 6 and cold mold 10. Still further, since sealing means 8 is resilient and locked against proximal movement along bushing 6, it elastically gives with changes in pressure applied against it either by the melt material during injection cycles of the machine, or with changes in the configuration of machine elements brought about by thermally induced expansion and/or contraction.

In addition, sealing means 8 is solid, and formed of a metallic alloy. Therefore, there is little chance of its degrading and/or flaking or breaking apart so as to damage parts or to block gate orifice 64. Finally, since the volume defined by sealing means 8, the tip 44 of bushing 6 and base 54 of bore 56 is kept very small, such melt material as may flow into that volume is very small. Accordingly, so-called "decompression" of degraded or off color material into shots of virgin melt are minimized, as is the chance of flakes or pieces of such material blocking gate 60.

Figure 8:
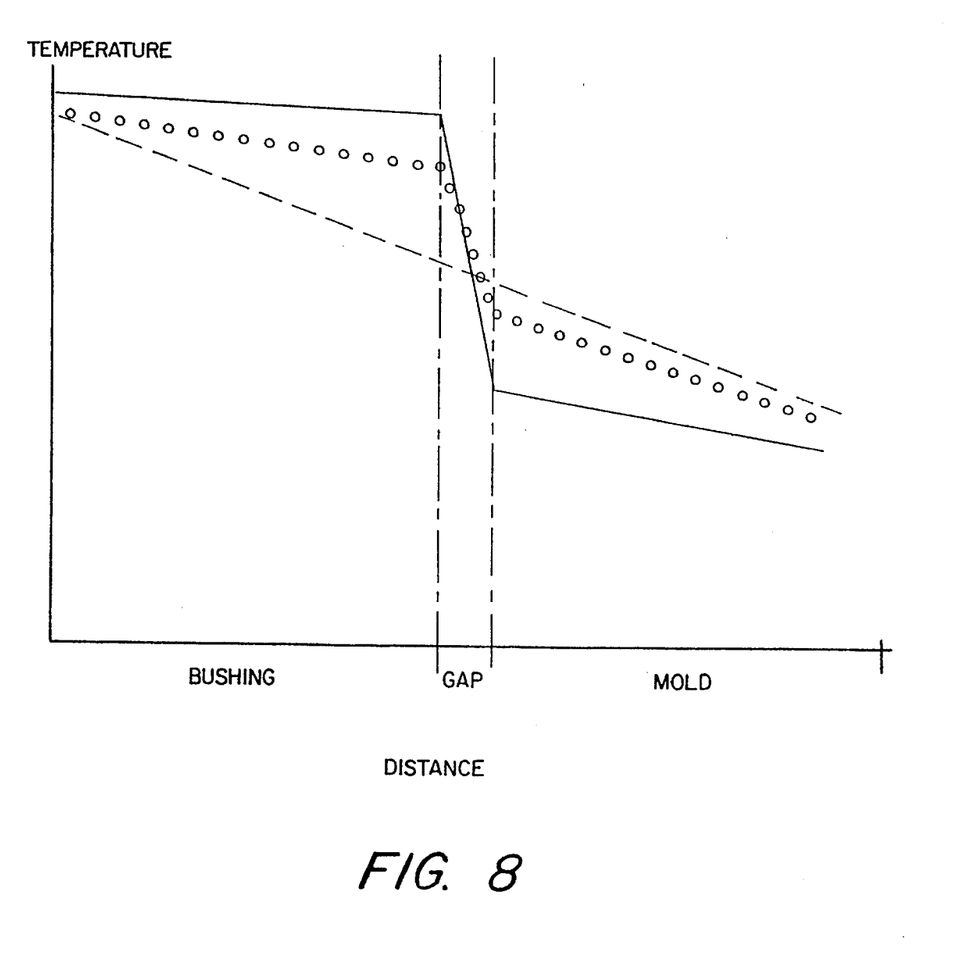
FIG. 8 is a graphical representation taken during the low pressure portion of an injection molding cycle of (i) the temperature gradient (profile) of a melt material located in the gap between the distal opening of a bushing and a mold gate of an injection molding system in accordance with the present invention in solid lines, (2) a similar temperature gradient of an injection molding apparatus wherein melt material fills the space between the bushing and the bore in the mold in dotted lines and (ii) of a similar temperature gradient of an injection molding apparatus wherein a solid metallic insert defines the gate area of the mold in dashed lines.

FIG. 8 illustratively shows the axial temperature gradients (profiles) (i) of a melt material located in the gap between the fourth (distal) opening 38 of bushing 6 and mold gate 60 of an injection molding apparatus in accordance with the present invention in solid lines, (ii) of the temperature gradient (profile) of an injection molding apparatus wherein melt material fills substantially the entire space between the bushing and the bore in the mold in dotted lines, and (iii) of the temperature gradient (profile) of an injection molding apparatus wherein a solid, metallic insert defines the gate area of the apparatus in dashed lines. From this comparison graph, it will be clear to those skilled in the art that the vestige break point of the apparatus of the present invention is more clearly defined than was heretofore possible, and that the apparatus operates over the entire processing range of the material (consistent with the constraints upon the geometric configuration of the system required by the nature of the material being processed therethrough).

Further modifications, changes, alterations and variations will occur to those skilled in the art in view of the foregoing detailed description of the preferred embodiment of the invention. It is, therefore, to be understood that the foregoing specification is to be considered as illustrative only, and not as limiting of the invention in its broadest aspects. It is intended that the invention should be limited only by the terms of the claims appended hereto.

What is claimed is:

1. An open bore, thermally gated injection molding apparatus comprising:

a source of melt material;

a heated manifold having an upper surface, a lower surface, and defining a runner channel extending therethrough from said upper surface to said lower surface;

a heated bushing having a first longitudinal axis, an upper end defining a first opening, a lower end defining a second opening, a lower portion adjacent to said lower end and a first outer surface located between said upper end and said lower portion, said bushing defining an unobstructed axial lumen connecting said first opening to said second opening;

a cooled mold having a top surface, a first bore extending into said top surface, an internal article formation cavity and a gate, said first bore having a second longitudinal axis and being defined by a first side wall and a base, and said gate connecting said base to said article formation cavity;

thin walled sealing means for sealingly connecting said bushing to the periphery of said first bore, said sealing means being formed of a material having low thermal conductivity, and having an inner portion and an outer portion, said inner portion being affixed to said bushing so as to surround said lower portion of said bushing in close proximity to said second opening such that said outer portion of said sealing means extends outwardly from said bushing; and, pressure means for alternately applying a first predetermined pressure to said melt material for a first preselected interval and a second, reduced predetermined pressure to said melt material for a second preselected interval;

wherein:

(a) said source of molten material communicates with said runner channel adjacent said upper surface of said manifold;

(b) said bushing extends outwardly from said lower surface of said manifold into said first bore such that said first longitudinal axis is substantially aligned with said second longitudinal axis;

(c) said bushing lumen communicates with said runner channel adjacent said lower surface of said manifold;

(d) said bushing resides at least partially in said first bore with said first outer surface located in spaced relation to said first side wall, with said lower portion located in closely spaced relation to said base and with said bushing lumen located in substantial alignment with said gate;

(e) said mold and said bushing together define a gate area comprising said gate, a first volume located between said gate and said second opening in said lower end of said bushing and a substantially annular volume surrounding said first volume, said gate area containing the thermal gradients between said heated bushing and said cooled mold which materially effect the thermal control of the flow of said melt material through said gate during said second preselected intervals; and (f) said outer portion of said sealing means is urged against the periphery of said first bore within said substantially annular volume so as to form a contact area with said periphery located in closely spaced relation to said gate, said contact area being substantially no larger than that necessary to close off the gap between said periphery of said first bore and said bushing against the passage of melt material.

2. The injection molding apparatus of claim 1 wherein said sealing means is formed of stainless steel.

3. The injection molding apparatus of claim 1 wherein said sealing means is formed of a metallic alloy containing about 76 percent nickel, about 15 percent chromium and about 9 percent iron.

4. The injection molding apparatus of claim 1 wherein at least a portion of said sealing means defines a transverse substantially arc-shaped cross-section having an open portion, and said open portion of said transverse cross-section faces substantially downwardly relative to said bushing.

5. The injection molding apparatus of claim 1 wherein said thin wall of said sealing means is between about 0.006 and 0.010 inches thick.

6. The injection molding apparatus of claim 1 wherein said base of said first bore and said lower portion of said bushing are separated by a gap of less than about 0.10 inches.

7. The injection molding apparatus of claim 1 wherein said bushing defines a seal receiving portion located at the joinder of said first outer surface and said lower portion of said bushing, said seal receiving portion comprising an annular surface having an upper edge and a first land surface, said annular surface being substantially parallel to said first longitudinal axis and said land surface extending substantially radially outwardly relative to said first longitudinal axis from said upper edge of said annular surface;

wherein a second land surface substantially perpendicular to said second longitudinal axis is located substantially at the joinder of said first side wall and said base of said first bore; and wherein said sealing means comprises a thin-walled ring having a substantially arc-shaped transverse cross-section defining an open side portion, said sealing means being located within the volume defined by said first land surface, said second land surface, said annular surface and said first side wall of said first bore such that said second outer surface of said sealing means is in substantially tangential compression fit contact with at least said annular surface and with the periphery of said first bore.

8. The injection molding apparatus of claim 7 wherein said open side portion of said transverse cross-section of said sealing means faces substantially downwardly relative to said bushing and said first bore.

9. The injection molding apparatus of claim 1 wherein the transverse cross-section of said sealing means is selected from the group consisting of (i) O-ring seals, (ii) O-ring seals having aligned, spaced openings therein, (iii) ring seals having substantially C-shaped transverse cross-sections, (iv) ring seals having generally arc-shaped transverse cross-sections, and (v) ring seals having substantially V-shaped transverse cross-sections.

10. The injection molding apparatus of claim 1 wherein said bushing defines a slot extending circumferentially around said bushing substantially adjacent to said lower end, wherein said sealing means comprises an element having an inner edge and a generally arc-shaped transverse cross-section, and wherein said inner edge of said sealing means is affixed within said slot such that said sealing means extends a preselected distance outwardly of said bushing.

11. The injection molding apparatus according to claim 1 wherein:

(a) said mold further comprises a substantially cylindrical portion extending substantially parallel to said second longitudinal axis and upwardly from said base in spaced relation to and surrounding said gate, said cylindrical portion defining a second bore within said first bore, said second bore having a second side wall;

(b) said bushing comprises a main portion having a first lower end, a first counterbore, a second counterbore and an insert portion, wherein (i) said second counterbore has a shorter length and greater diameter than said first counterbore, (ii) said first and second counterbores extend into said first lower end, (iii) said insert member has a second upper end and a second lower end, (iv) said main portion and said insert portion each include a side wall defining a lumen extending therethrough, and (v) said second upper end of said insert portion engages said first counterbore such that its lumen communicates with said lumen of said main portion;

(c) said cylindrical portion engages said second counterbore such that said insert portion extends into said second bore in spaced relation to said second side wall and said base, and said insert portion lumen is in substantial alignment with said gate; and (d) said sealing means is affixed to said insert portion so as to surround said insert portion in substantial proximity to said second lower end thereof and so as to extend outwardly from said insert portion such that said outer surface of said sealing means is urged against the periphery of said second bore so as to form a contact area therewith substantially no larger than that necessary to close off the gap between said second bore and said insert portion against the passage of melt material.

12. An open bore, thermally gated, injection molding apparatus comprising:

a source of melt material;

a heated manifold having an upper surface and a lower surface, and defining a runner channel extending therethrough from said upper surface to said lower surface, said runner channel being adapted to receive melt material from said source adjacent to said upper surface, to transmit said melt material therethrough, and to discharge said melt material adjacent to said lower surface;

a cooled mold having a top surface, an internal article formation cavity and a first bore connecting said top surface to said article formation cavity, said first bore having a first longitudinal axis and being defined by a first side wall;

pressure means for alternately applying a first predetermined pressure to said melt material for a first preselected interval and a second, reduced predetermined pressure to said melt material for a second preselected interval;

a member having a second longitudinal axis, a first end, a second end, a second side wall forming a cavity extending into said first end to a first base, and a first gate extending from said first base to said second end, said member being sized so as to engage said first side wall of said bore in substantially uniformly contacting and isothermal relation such that said second end is located substantially adjacent to said article formation cavity and said first gate is substantially aligned with said first and second longitudinal axes;

a heated elongated element having a top end attached to said lower surface of said manifold and defining a first opening, a bottom end defining a second opening, a bottom portion adjacent said bottom end, an outer surface located between said top end and said bottom portion, an unobstructed lumen connecting said first opening to said second opening, said lumen being adapted to receive melt material from said runner channel at said first opening and to discharge said melt material from said second opening, and seal receiving means located in said bottom portion substantially adjacent to said bottom end in surrounding, closely proximate and equally spaced relation to said second opening;

said elongated element being located at least partially within said cavity such that at least said bottom portion thereof is located in closely spaced relation to the periphery of said cavity, said second opening is located close to, and in substantial longitudinal alignment with, said first gate, and said member and said element together define a gate area comprising said first gate, a first volume located between said first gate and said second opening in said bottom end of said elongated element and a substantially annular volume surrounding said first volume, said gate area containing the thermal gradients between said elongated element and said member which materially effect the thermal control of the flow of said melt material through said first gate during said second preselected intervals; and thin-walled sealing means for sealingly connecting said elongated element to said periphery of said cavity, said sealing means being formed of a material having low thermal conductivity and defining an inner portion attached to said elongated element along said seal receiving means such that said sealing means extends outwardly from said elongated element and is urged against said member so as to form a contact area therewith within said substantially annular volume located in closely spaced relation to said first gate, said contact area being substantially no larger than that necessary to close off the gap between said elongated element and said member against the passage of said melt material.

13. An injection molding apparatus according to claim 12 wherein said bore in said mold terminates at a second base spaced from said article formation cavity, a second gate connects said second base to said article formation cavity, and said member is inserted into said bore such that said first gate is substantially axially aligned with said second gate and said first and second gates are closely longitudinally spaced relative to each other.

14. An injection molding apparatus according to claim 12 wherein:

said second side wall is substantially cylindrical and has a diameter smaller than the diameter of said first bore adjacent said first end of said member;

said elongated element further comprises a first counterbore, a second counterbore and an insert;

said counterbores extend into said elongated element bottom end longitudinally adjacent to said elongated element lumen, said second counterbore being of larger diameter but shorter length than said first counterbore;

said insert includes an upper end, a lower end, and an insert lumen extending longitudinally therethrough from a third opening in said upper insert end to a fourth opening in said insert lower end, said insert defining said seal receiving means proximally adjacent to said fourth opening and said upper insert end being engaged within said first counterbore such that said third opening communicates with said elongated element lumen; and said first end of said member engages said second counterbore such that said insert extends into said cavity in spaced relation to said second side wall, said lower insert end resides in closely spaced relation to said first base, and said insert lumen is longitudinally aligned with said first gate.

15. An injection molding apparatus according to claim 12 wherein:

said member defines a substantially cylindrical projection extending upwardly from said first base in spaced, surrounding relation to said first gate;

said elongated element further comprises a first counterbore, a second counterbore and an insert;

said counterbores extending into said elongated element bottom end longitudinally adjacent to said elongated element lumen, said second counterbore being of larger diameter but shorter length than said first counterbore;

said insert includes an upper end, a lower end, and an insert lumen extending longitudinally therethrough from a third opening in said upper insert end to a fourth opening in said insert lower end, said insert defining said seal receiving means proximally adjacent to said fourth opening and said upper insert end being engaged within said first counterbore with said third opening in communication with said elongated element lumen; and said cylindrical projection is engaged within said second counterbore such that said insert is located in inwardly spaced relation to said cylindrical projection, said lower insert end resides closely spaced relation to said first base, and said insert lumen is longitudinally aligned with said first and second gates.

16. A device comprising a bushing component having an open bore, a thermally gated injection molding apparatus including means for alternately applying a first predetermined pressure to melt material passing through said apparatus for a first preselected interval and for applying a second, reduced predetermined pressure to said melt material during a second preselected interval, a mold having an outer cavity, an article formation cavity and a gate connecting said outer cavity to said article formation cavity; said bushing component comprising:

a heated elongated element having a longitudinal axis, a top end, a bottom end, a first opening in said top end, a second opening in said bottom end, an outer surface, an unobstructed lumen connecting said first opening to said second opening and seal engagement means extending around said bushing in close proximity to said second opening;

said elongated element being sized and adapted for telescopic insertion into said outer cavity of said mold bottom end first such that the periphery of said outer cavity and said elongated element together define a gate area including said gate, a first volume located between said second opening and said gate, and a substantially annular volume surrounding said first volume, said gate area containing the thermal gradients between said mold and said elongated element which materially effect the thermal control of the flow of said melt material through said gate during said second preselected intervals; and, sealing means for sealingly connecting said elongated element to the periphery of said outer cavity, said sealing means comprising a thin-walled structure having low thermal conductivity, an outer portion and an inner portion, said inner portion of said sealing means being attached to said said seal engagement means so as to locate said outer portion a preselected distance outwardly from said elongated element in engagement with the periphery of said outer cavity of said mold within said annular volume.

17. The device of claim 16 wherein said sealing means has a substantially arc-shaped transverse cross-section including an open side, said sealing means being so disposed relative to said bushing that said open side of said arc-shaped cross-section faces substantially downwardly relative to said bushing.

18. The device of claim 17 wherein said sealing means comprises a thin-walled, hollow O-ring defining circumferentially spaced openings along the portions of its wall facing downwardly relative to said bushing.

19. The device of claim 16 wherein said sealing means is formed of stainless steel.

20. The device of claim 16 wherein said sealing means is formed of a metallic alloy containing about 76 percent nickel, about 15 percent chromium, and about 9 percent iron.

21. The device of claim 16 wherein said sealing means comprises a thin-walled, substantially hollow stainless steel element having a wall thickness between about 0.006 and about 0.010 inches.

22. The device of claim 16 wherein said seal engagement means defines a seal receiving portion located at the joinder of said outer surface and said bottom end of said elongated element, said seal receiving portion comprising an annular surface having an upper edge and a land surface, said annular surface being substantially parallel to said longitudinal axis of said elongated element and said land surface extending substantially radially outwardly relative to said longitudinal axis of said elongated element from said upper edge of said annular surface; and     wherein said sealing means comprises a thin-walled ring having a substantially arc-shaped transverse cross-section defining an open side portion, said inner portion of said sealing means being located in compression fit contact with said annular surface.

23. The device of claim 22 wherein said open side portion of said transverse cross-section of said sealing means faces substantially downwardly relative to said elongated element.

24. The device of claim 16 wherein the transverse cross-section of said sealing means is selected from the group consisting of (i) O-ring seals, (ii) O-ring seals having circumferentially aligned, spaced openings therein, (iii) ring seals having substantially C-shaped transverse cross-sections, (iv) ring seals having generally arc-shaped transverse cross-sections, and (v) ring seals having substantially V-shaped transverse cross-sections.

25. The device of claim 16 wherein said elongated element defines a circumferential slot substantially adjacent to said bottom end, wherein said sealing means comprises an element having an inner edge and a generally arc-shaped transverse cross-section, and wherein said inner edge of said sealing means is affixed within said slot.

26. A device according to claim 16 wherein:

(a) said elongated element further comprises a first portion having a first lower end, a first counterbore extending into said first lower end, and an insert member having a second upper end and a second lower end; said first portion and said insert each defining a lumen extending substantially longitudinally therethrough; and said second upper end of said insert being fixedly engaged within said first counterbore such that its lumen communicates with said lumen of said first portion; and, (b) said sealing means is affixed to said insert so as to surround said insert in substantial proximity to said second lower end thereof, and so as to extend a preselected distance outwardly from said insert.

27. A device comprising a bushing assembly having an open bore, a thermally gated injection molding apparatus including means for alternately applying a first predetermined pressure to melt material passing through said apparatus for a first preselected interval and a second, reduced pressure to said melt material for a second preselected interval, a cooled mold having a top surface, an internal article formation cavity and an opening connecting said top surface to said article formation cavity; said bushing assembly comprising:

a member having a longitudinal axis, a first end, a second end, a side wall forming a cavity extending into said first end to a base, and a gate connecting said base to said second end, said member being sized and adapted for location in said opening in substantially uniformly contacting and isothermal relation with said mold;

a heated elongated element having a top end, a bottom end, a first opening in said top end, a second opening in said bottom end, a bottom portion adjacent said bottom end, an outer surface located between said top end and said bottom portion, an unobstructed lumen connecting said first and second openings, said lumen being adapted to receive said melt material at said first opening and to discharge said melt material from said second opening, and seal receiving means located in said bottom portion substantially adjacent to said bottom end in surrounding, closely proximate, and equally spaced relation to said second opening;

said elongated element being sized and adapted for location at least partially within said cavity such that at least said bottom portion thereof is located in closely spaced relation to the periphery of said cavity, said second opening is located close to, and in substantial longitudinal alignment with, said gate, and said member and said elongated element together define a gate area comprising said gate, a first volume located between said gate and said second opening in said elongated element and a substantially annular volume surrounding said first volume, said gate area containing the thermal gradients between said elongated element and said member which materially effect the thermal control of the flow of said melt material through said gate during said second preselected intervals; and thin-walled sealing for sealingly connecting said elongated element to said periphery of said cavity, said sealing means being means formed of a material having low thermal conductivity defining an inner portion attached to said elongated element along said seal receiving means such that said sealing means extends outwardly from said elongated element and such that when said elongated element is operatively located in said cavity said sealing means is urged against said member so as to form a contact area therewith within said substantially annular volume, said contact area being substantially no larger than that necessary to close off the gap between said elongated element and said member against the passage of said melt material.

28. The device according to claim 27 further characterized in that:

said member defines a substantially cylindrical projection extending upwardly from said base surrounding said gate;

said elongated element further comprises a first counterbore, a second counterbore and an insert;

said counterbores extend into said elongated element bottom end longitudinally adjacent to said elongated element lumen, said second counterbore being of larger diameter but shorter length than said first counterbore;

said insert includes an upper end, a lower end, and an insert lumen extending longitudinally therethrough from a third opening in said upper insert end to a fourth opening in said insert lower end, said insert defining said seal receiving means proximally adjacent to said fourth opening and said upper insert end being engaged within said first counterbore with said third opening in communication with said elongated element lumen; and said cylindrical projection is engaged within said second counterbore such that said insert is located in inwardly spaced relation to said cylindrical projection, said lower insert end resides closely spaced relation to said base, and said insert lumen is longitudinally aligned with said gate.

\* \* \* \* \*